United States Patent [19]
Prasad

[11] Patent Number: 5,826,083
[45] Date of Patent: Oct. 20, 1998

[54] CPU CYCLE CONSUMPTION SELF-REGULATING METHOD AND APPARATUS

[75] Inventor: Rama R. Prasad, Beaverton, Oreg.

[73] Assignee: Intel Corporation, Santa Clara, Calif.

[21] Appl. No.: 668,567

[22] Filed: Jun. 20, 1996

[51] Int. Cl.⁶ ........................................... G06F 9/00
[52] U.S. Cl. ............................................ 395/675; 395/672
[58] Field of Search ..................... 395/674, 675, 395/304, 672; 370/259

[56] References Cited

U.S. PATENT DOCUMENTS

| | | | |
|---|---|---|---|
| 4,262,331 | 4/1981 | Freeland et al. | 395/304 |
| 5,497,373 | 3/1996 | Hullen et al. | 370/259 |

Primary Examiner—Majid A. Banankhah
Attorney, Agent, or Firm—Blakely, Sokoloff, Taylor & Zafman

[57] ABSTRACT

A computer system is programmed with a CPU intensive application that self-regulates its consumption of CPU cycles. More specifically, the CPU intensive application includes mainline logic that are designed to be able to be executed at different functional levels, consuming different rates of CPU cycles, and self-regulating logic for monitoring CPU load, and decrementally adapting the CPU intensive application to decreasingly lower functional level, and therefore lower rate of CPU cycle consumptions, in accordance to a set of adaptive policies. The set of adaptive rules specify a number of domain specific responses to various CPU load conditions.

34 Claims, 4 Drawing Sheets

CPU CYCLE CONSUMPTION SELF-REGULATING METHOD AND APPARATUS

BACKGROUND OF THE INVENTION

1. Field of the Invention

The present invention relates to the field of computer systems. More specifically, the present invention relates to the management of CPU cycle consumptions on computer systems.

2. Background Information

Traditionally, management of CPU cycle consumption by concurrently executing applications for the purpose of ensuring each of the executing applications will receive a proper share of the CPU cycles is the responsibility of the operating system. For examples, time-sharing operating systems would employ certain time slicing schemes to allocate CPU cycles, and ensure all time-shared applications will receive their "fair share" of CPU cycles, whereas real time operating systems would employ certain priority interrupt schemes to allocate CPU cycles, and ensure the higher priority applications will be attended to over the lower priority applications. Additionally, real time operating systems typically will also employ certain priority adjustment schemes to ensure the lower priority applications will nevertheless receive certain minimum amounts of CPU cycles.

However, these traditional approaches all share a common disadvantage, in that the operating system essentially is trying to cope with the demands of the concurrently executing applications, for a given finite amount of CPU resources of a particular system. The operating system is unable to influence the demand on the system, which is something only the applications themselves can do. While many applications are customizable in terms of their runtime characteristic at initialization or start up time, which can be viewed as static demand management, it is desirable if the applications can dynamically and adaptively manage their demand for CPU resources, thereby complementing the operating system in the overall management of CPU cycle consumption on a system.

As will be disclosed in more detail below, the method and apparatus of the present invention for self-regulated CPU cycle consumption on a system achieves these and other desirable results.

SUMMARY OF THE INVENTION

A computer system is programmed with a CPU intensive application that self-regulates its consumption of CPU cycles. More specifically, the CPU intensive application includes mainline logic that are designed to be able to be executed at different functional levels, consuming different rates of CPU cycles, and self-regulating logic for monitoring CPU load, and decrementally adapting the CPU intensive application to decreasingly lower functional levels, and therefore lower rates of CPU cycle consumptions, in accordance to a set of adaptive policies. The set of adaptive policies specify a number of domain specific responses to various CPU load conditions.

In one embodiment, the CPU intensive application further includes calibration logic for calibrating the CPU intensive application's load on the CPU. In an alternate embodiment, the CPU intensive application includes computation logic for computing the CPU intensive application's load on the CPU instead.

In one embodiment, the CPU intensive application is a video conferencing application. The different functional levels include a first fully functional level, a second functional level with local video display frozen, a third functional level with remote video display frame rate also being slow down, and a fourth functional level with remote video display frames also being systematically dropped. The set of adaptive policies include a first domain specific response of operating at the second functional level, i.e. freezing local video display, if the CPU load exceeds the video conferencing application's load on the CPU by a predetermined threshold, a second domain specific response of operating at the third functional level, i.e. slowing down remote video display frame rate, if the CPU load continues to exceed the video conferencing application's load on the CPU by the predetermined threshold even after the first domain specific response, and a third domain specific response of operating at the fourth functional level, i.e. systematically dropping remote video frames, if the CPU load continues to exceed the video conferencing application's load on the CPU by the predetermined threshold even after the second domain specific response.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
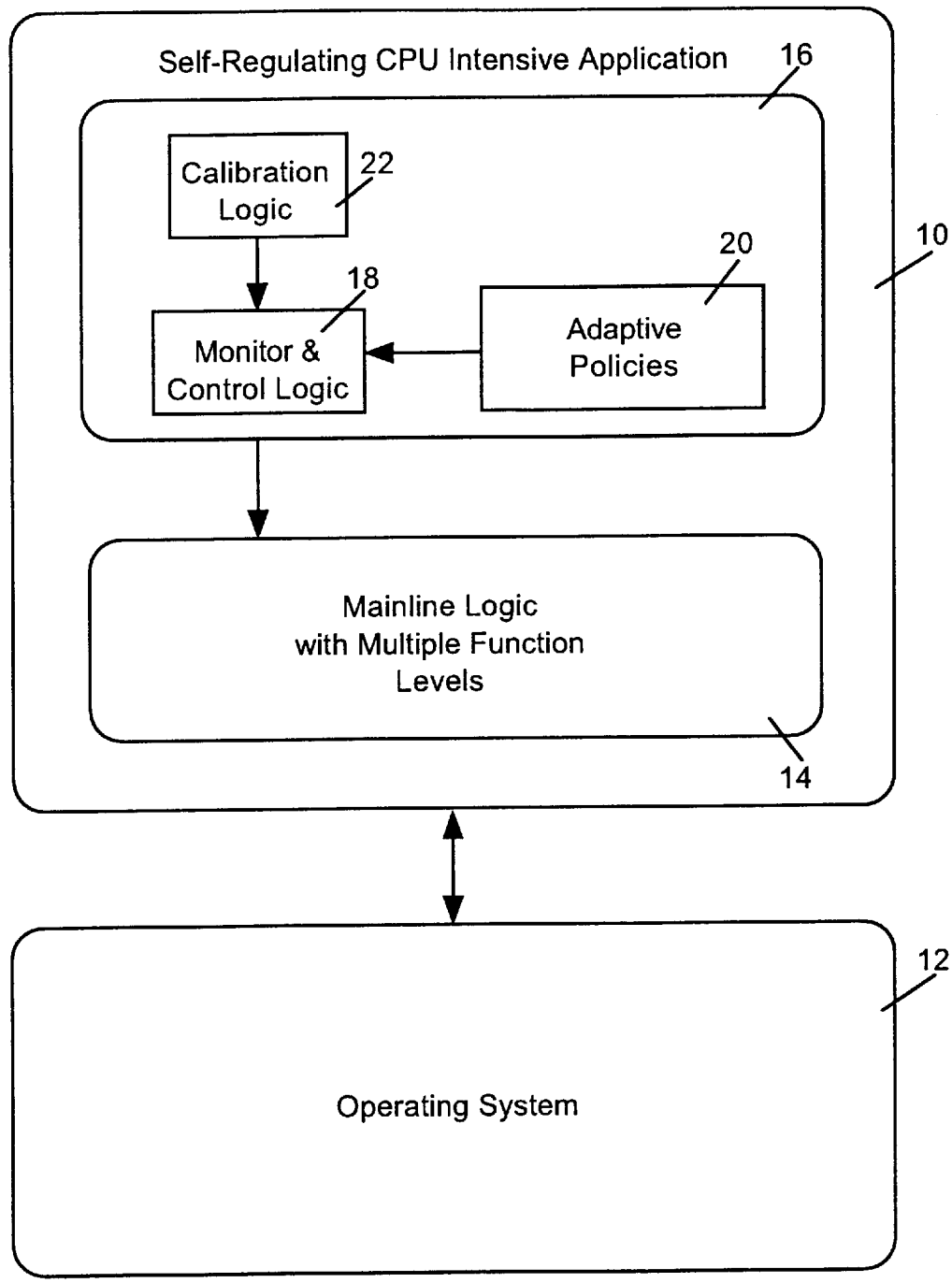
FIG. 1 is a block diagram illustrating the present invention.

Referring now to FIG. 1 a block diagram illustrating the present invention is shown. As illustrated, the present invention includes application 10, which self-regulates its consumption of CPU cycles, thus complementing operating system 12 in the overall management of CPU cycle consumption on the system they reside. Except for the teachings of the present invention incorporated, application 10 is intended to represent a broad category of applications. While typically application 10 is a CPU intensive application, such as a numerical application or a video conferencing application, however, as will be obvious from the description to follow, that is not necessary the case.

Application 10 includes mainline logic 14 that are designed to be executable at any number of functional levels, and self-regulating logic 16 for selfregulating its consumption of CPU cycles. Self-regulating logic 16 includes monitor and control logic 18 for monitoring CPU load of the system, and decrementally adapting execution of mainline logic 14 to decreasingly lower functional levels, in accordance to adaptive policies 20. The adaptive policies 20 specify a number of application dependent or domain specific responses to a number of CPU load conditions.

For the illustrated embodiment, monitor and control logic 18 utilizes the services offered by operating system 14 to monitor CPU load. These services are well known in the art. Alternatively, monitor and control logic 18 may be implemented with its own direct monitor and control in a number of well known manners. Additionally, for the illustrated embodiment, self-regulating logic 16 also includes calibration logic 22 for calibrating application 10's load on the CPU of the system, at application start up time, by engendering execution of a number of representative functions of mainline logic 14. In an alternate embodiment, computation logic for computing application 10's load on the CPU of the system, at application start up time, may be employed instead. For example, computation logic may compute the CPU load based on certain processing rates set for certain essential functions of mainline logic 14, and the system throughput rate, which itself may be inferred from e.g. the processor clock rate.

Figure 2:
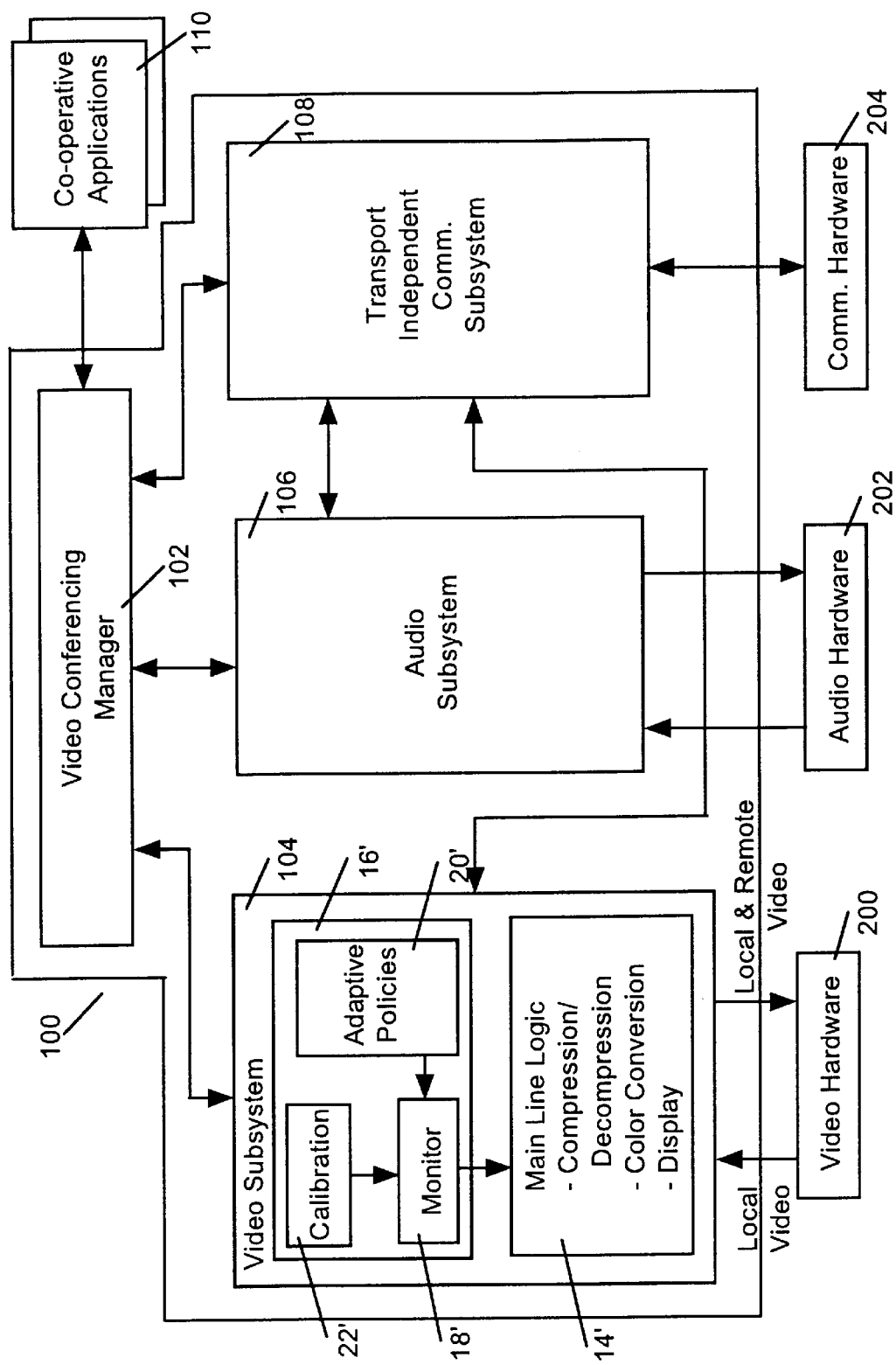
FIG. 2 is a block diagram illustrating one embodiment of the present invention in the form of a sample video conferencing application incorporated with the teachings of the present invention.

FIG. 2 illustrates one embodiment of the present invention in the form of a sample video conferencing application incorporated with the teachings of the present invention. Sample video conferencing application 100 includes video conferencing manager 102, video subsystem 104, audio subsystem 106, and transport independent communication subsystem 108. Video conferencing manager 102 is responsible for managing the overall video conference, including management of an end user interface to a local conference participant, connect and disconnect services etc. Video subsystem 102 is responsible for providing video services to video conference manager 102, and interacting with video hardware 200 of the video conferencing system. In particular, video subsystem 102 provides decompression services for remote video received by transport independent communication subsystem 108, and color conversion services to decompressed remote video as well as local video captured by video hardware 200. For the illustrated embodiment, video hardware 200 provides a compressed as well as decompressed version of local video captured. However, as will be obvious from the description to follow, the present invention may be practiced with video subsystem 104 also providing compression services to local video captured from video hardware.

Furthermore, in accordance to the present invention video subsystem 102 includes mainline logic 14' for providing the mainline video services described above, and self-regulating logic 16' for self-regulating CPU cycle consumption by mainline logic 14'. For the illustrated embodiment, the functional levels of mainline logic 14' includes a first full functional level, a second functional level with local video display frozen, a third functional level with remote video frame rate slowed down, and a fourth functional level with remote video frames being systematically dropped. While operating at the fourth functional level, mainline logic 14' would request its counterpart to re-provide the last key frame when it resumes decoding remote video frames. Self-regulating logic 16' includes monitor logic 18', adaptive policies 20' and calibration logic 22'. Monitor logic 18' monitors CPU load of the conferencing system during operation, and decrementally adapt execution of mainline logic 14' to decreasing lower functional levels, i.e. local video frozen, etc., in accordance to adaptive policies 20', to be described more fully below. Calibration logic 22' calibrates video conferencing application 100's load on the conferencing system, at video conferencing application 100 start up time.

Audio subsystem 106 is responsible for audio services to video conference manager 102, and interacting with audio hardware 202 of the video conferencing system. In particular, audio subsystem 106 provides compression and decompression services for both remote audio received by transport independent communication subsystem 108 and local audio captured by audio hardware 202. Transport independent communication subsystem 108 is responsible for communication services for the functional component/subsystems of video conferencing application 100 in a transport independent manner, and interfacing with the transport specific communication hardware 204, e.g. LAN, POTS etc.

For the illustrated embodiment, video conferencing application 100 also cooperates with other video conferencing related applications 110. While for the illustrated embodiment, the teachings of the present invention are incorporated in video subsystem 104, however, they may be incorporated in audio subsystem 106, or video conferencing application 100 in alternative manners. Except for the teachings of the present invention incorporated, video conferencing application 100 is intended to represent a broad category of video conferencing applications, including but not limited to the ProShare™ Video/Data Conferencing System, manufactured by Intel Corporation, Santa Clara, Calif., assignee of the present invention.

Figure 3:
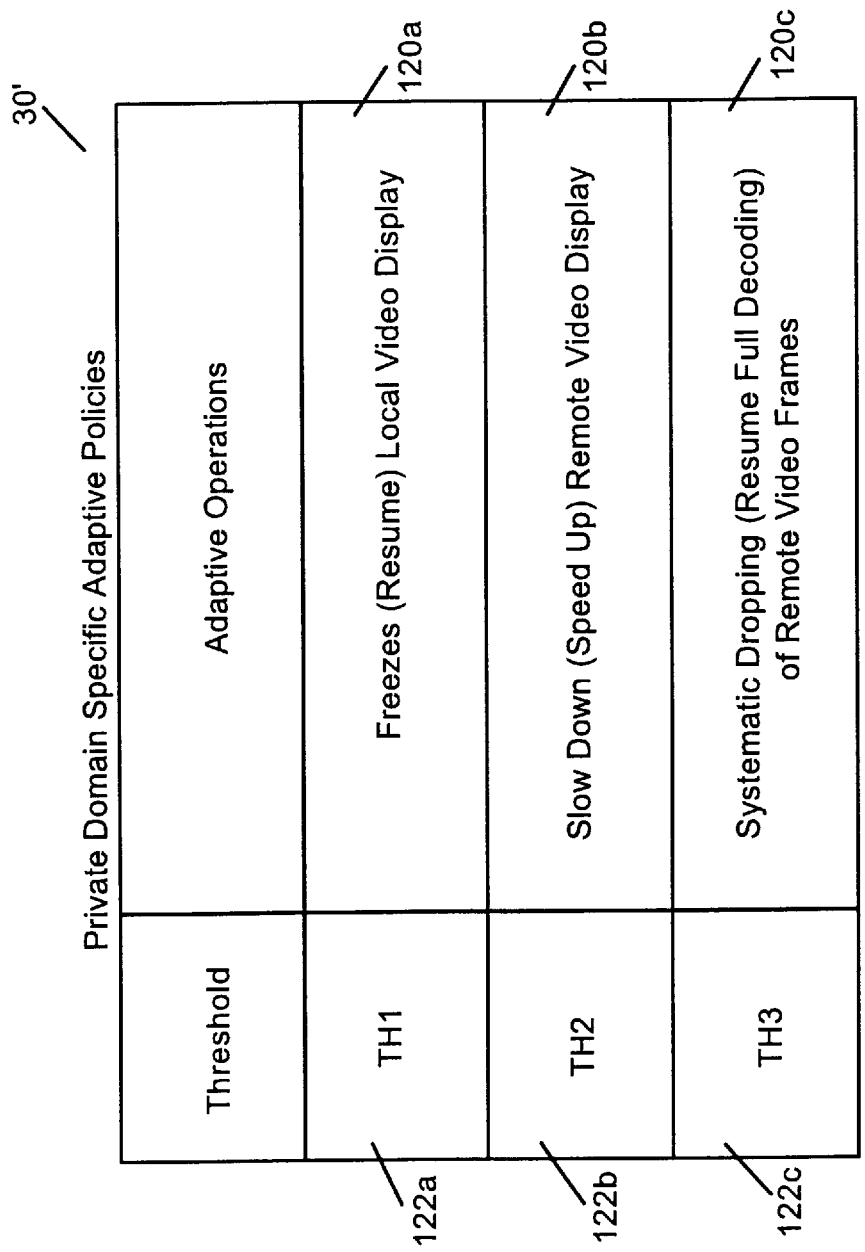
FIG. 3 a block diagram illustrating one embodiment of the adaptive policies of the sample application in accordance to the present invention.

FIG. 3 illustrates a number of sample adaptive policies for the sample self-regulating video conferencing application illustrated in FIG. 2. As shown, sample adaptive policies 20' include a number of domain specific responses 120a–120c to a number of CPU load conditions. Domain specific responses refer to the fact that the responses are stratified in an application dependent manner, requiring specific knowledge of the application, which are generally not available to the operating system, and therefore unable to be undertaken by the operating system. For the illustrated embodiment, first domain specific response 120a adapts execution of video subsystem 104 at the second lower functional level, i.e. local video display frozen, when the CPU load exceeds video conferencing application 100's load on the CPU by a first predetermined threshold (th1).

Second domain specific response 120b further adapts execution of video subsystem 104 to the third lower functional level, i.e. remote video frame rates slowed down, when the CPU load continues to exceed video conferencing application 100's load on the CPU by a second predetermined threshold (th2) after the first domain specific response. Third domain specific response 120b adapts execution of video subsystem 104 to the fourth lower functional level, i.e. remote video frames systematically dropped, when the CPU load continues to exceed video conferencing application 100's load on the CPU by a third predetermined threshold (th3) after the second domain specific response.

For the illustrated embodiment, each of the domain specific responses has two prongs to them, the first prongs being the responses described above, whereas the second prongs are the respective complements to the first prongs for incrementally adapting execution of video subsystem 104 to increasingly higher functional levels if after the corresponding domain specific responses, the CPU load excess over the video conferencing application 100's load on the CPU falls below the corresponding predetermined thresholds (th1–th3). More specifically, first domain specific response 120a further include adapting execution of video subsystem 104 back at the first full functional level, if after adapting execution at the second lower functional level, the CPU load excess over video conferencing application 100's load on the CPU falls below th1. Second domain specific response 120b further includes adapting execution of video subsystem 104 back at the second lower functional level, if after adapting execution at the third lower functional level, the CPU load excess over video conferencing application 100's load on the CPU falls below th2. Third domain specific response 120c further includes adapting execution of video subsystem 104 back at the third lower functional level, if after adapting execution at the fourth lower functional level, the CPU load excess over video conferencing application 100's load on the CPU falls below th3.

In order to avoid excessive adaptations between different functional levels, for the illustrated embodiment, self-regulating logic 16' only adapts execution of video subsystem 104 to another functional level (lower or higher), only if video subsystem 104 has been executed at the current functional level for a predetermined amount of time. Alternatively, the same desired result can be achieved by self-regulating logic 16' temporarily suspending monitoring of CPU load for the predetermined among of time, after adapting execution of video subsystem 104 to a new functional level (lower or higher). As a further alternative, the same desired result can also be achieved by self-regulating logic 16' adapting execution of video subsystem 104 to a new functional level (lower or higher), only if the CPU load excess is above/below the corresponding critical predetermined thresholds (th1–th3) for corresponding predetermined amounts of time.

As will be appreciated by those skilled in the art, these domain specific responses are action that can be taken by the video conferencing application 100 itself, or another application that knows the functional stratification of the regulated application only. These regulating responses can not be taken by an operating system who has no knowledge of the functional stratification of the regulated application. Additionally, those skilled in the art will also appreciate that mainline logic 14' may be designed to be executed at more than four functional levels, and adaptive policies may also include more than three domain specific responses. Furthermore, th1, th2, and th3, may or may not be the same.

Figure 4:
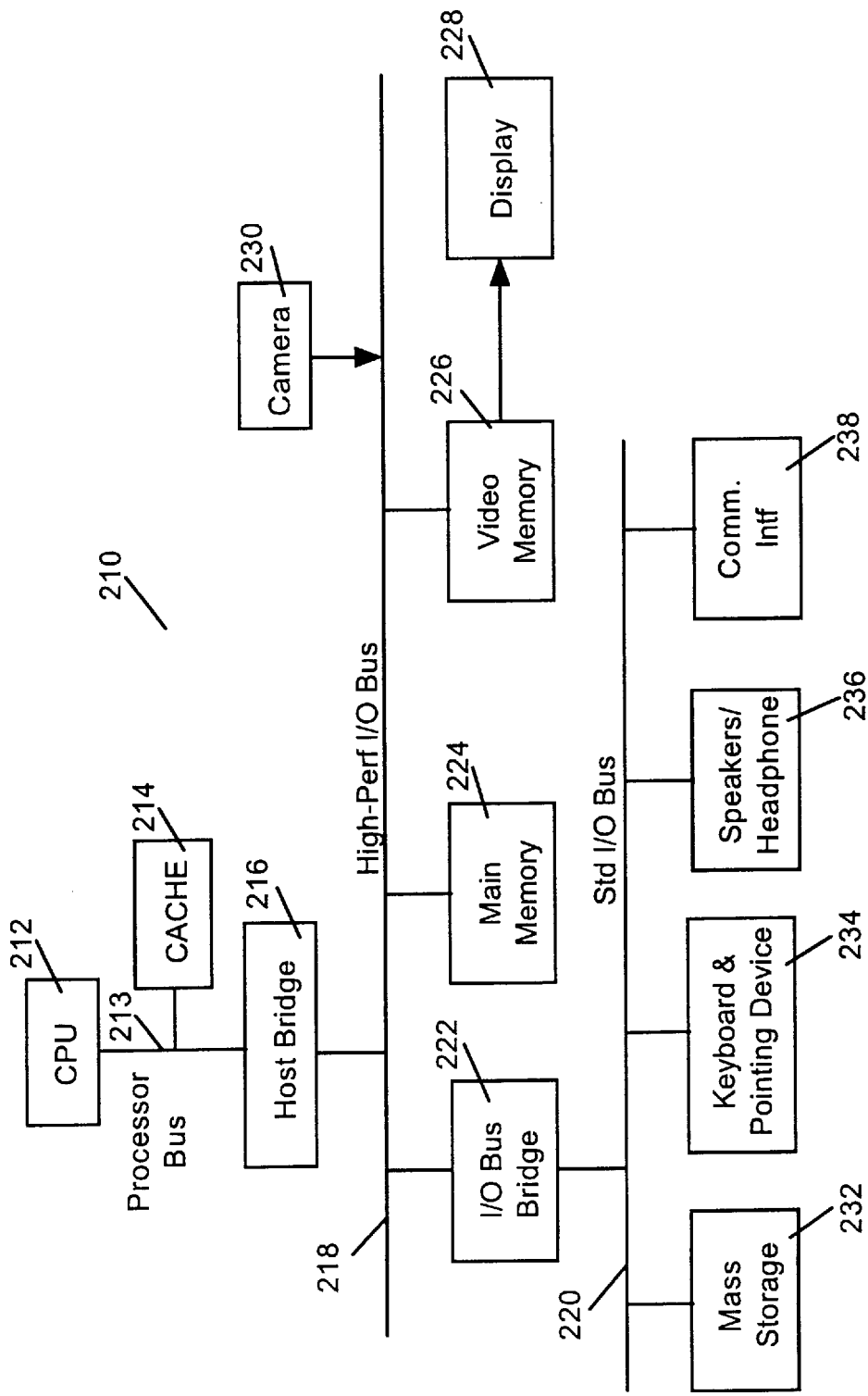
FIG. 4 is a block diagram illustrating a sample computer system which can be programmed with the sample application of FIGS. 2–3.

FIG. 4 illustrates a sample computer system that can be programmed with sample video conferencing application 100. Sample computer system 210 includes CPU 212 and cache memory 214 coupled to each other through processor bus 213. Sample computer system 210 also includes high performance I/O bus 218 and standard I/O bus 220. Processor bus 213 and high performance I/O bus 218 are bridged by host bridge 216, whereas high performance I/O bus 218 and standard I/O bus 220 are bridged by bus bridge 222. Coupled to high performance I/O bus 218 are main memory 224, video memory 226 and camera 230. Coupled to video memory 226 is video display 228. Coupled to standard I/O bus 220 are mass storage 232, keyboard and pointing devices 234, speakers/headphone 236 and communication interface 238.

These elements perform their conventional functions. In particular, mass storage 232 is used to provide permanent storage for the executable instructions of video conferencing application 100, whereas main memory 224 is used to temporarily store the executable instructions of video conferencing application 100 during execution by CPU 212.

Except for the teachings of the present invention incorporated in programmed video conferencing application 100, these elements are well known in the art. Sample computer system 210 is intended to represent a broad category of general as well as special purpose computer systems, including but not limited to computer systems based on the Pentium™ processor, manufactured by Intel Corp.

Thus, a method and apparatus for self-regulated CPU cycle consumption has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
   a CPU for executing programming instructions; and
   a storage medium coupled to the execution unit, and having stored therein programming instructions to be executed by the CPU during operation, the programming instructions having mainline logic that can be adaptively executed at different functional levels, consuming different rates of CPU cycles, and self-regulating logic for monitoring CPU load, and decrementally adapting execution of the mainline logic at decreasingly lower functional level, resulting in lower rates of CPU cycle consumption, in accordance to a set of adaptive policies.

2. The apparatus as set forth in claim 1, wherein the programming instructions further include calibration logic for calibrating the programming instructions' load on the CPU.

3. The apparatus as set forth in claim 1, wherein the programming instructions further include computation logic for computing the programming instructions' load on the CPU.

4. The apparatus as set forth in claim 1, wherein the set of adaptive policies specify a number of domain specific responses to a number of CPU load conditions.

5. The apparatus as set forth in claim 1, wherein
   the different functional levels include a first functional level and a second functional level, which is lesser in function than the first function level; and the set of adaptive policies include a first domain specific response of adapting execution of the mainline logic from the first functional level to the second lower functional level if the CPU load exceeds the programming instructions' load on the CPU by a first predetermined threshold.

6. The apparatus as set forth in claim 5, wherein the self-regulating logic also incrementally adapting execution of the mainline logic back at increasingly higher functional levels in accordance to the set of adaptive policies; and the set of adaptive policies include a second domain specific response of adapting execution of the mainline logic from the second functional level back to the first functional level if after the first domain specific response, the CPU load excess over the programming instructions' load on the CPU falls below the first predetermined threshold.

7. The apparatus as set forth in claim 6, wherein the self-regulating logic adapts execution of the mainline logic from the first functional level to the second functional level, or from the second function level back to the first functional level, only if the mainline logic has been adapted to execute at the first or the second functional level respectively for at least a predetermined amount of time.

8. The apparatus as set forth in claim 6, wherein the self-regulating logic further temporarily suspends monitoring of CPU load for a predetermined amount of time, whenever the mainline logic is adapted to execute at a new functional level.

9. The apparatus as set forth in claim 6, wherein the self-regulating logic adapts execution of the mainline logic from the first functional level to the second functional level, or from the second function level back to the first functional level, only if the CPU load excess over the programming instruction's load on the CPU is above or below the first predetermined threshold respectively by a predetermined amount of time.

10. The apparatus as set forth in claim 5, wherein the different functional levels further include a third functional level, which is lesser in function than the second functional level; and the set of adaptive policies further include a second domain specific response of further adapting execution of the mainline logic at the third functional level if the CPU load continues to exceed the programming instructions' load on the CPU by a second predetermined threshold after the first domain specific response.

11. The apparatus as set forth in claim 1, wherein the programming instructions implement a video conferencing application, and the different functional levels include a first full functional level.

12. The apparatus as set forth in claim 11, wherein the different functional levels further include a second lower functional level with local video display frozen; and the set of adaptive policies include a first domain specific response of adapting execution of the mainline logic at the second lower functional level if the CPU load exceeds the programming instructions' load on the CPU by a first predetermined threshold.

13. The apparatus as set forth in claim 12, wherein the self-regulating logic also incrementally adapting execution of the mainline logic back at increasingly higher functional levels in accordance to the set of adaptive policies; and the set of adaptive policies include a second domain specific response of adapting execution of the mainline logic back at the first full functional level if after the first domain specific response, the CPU load excess over the programming instructions' load on the CPU falls below the first predetermined threshold.

14. The apparatus as set forth in claim 12, wherein the different functional levels further include a third lower functional level with remote video display frame rate being slowed down; and the first set of adaptive policies further include a second domain specific response of adapting execution of the mainline logic at the third lower functional level if the CPU load continues to exceed the programming instructions' load on the CPU by a second predetermined threshold after the first domain specific response.

15. The apparatus as set forth in claim 14, wherein the self-regulating logic also incrementally adapting execution of the mainline logic back at increasingly higher functional levels in accordance to the set of adaptive policies; and the set of adaptive policies further include a third domain specific response of adapting execution of the mainline logic back at the second lower functional level if after the second domain specific response, the CPU load excess over the programming instructions' load on the CPU falls below the second predetermined threshold.

16. The apparatus as set forth in claim 14, wherein the different functional levels further include a fourth lower functional level with remote video display frame rate being systematically dropped; and the first set of adaptive policies further include a third domain specific response of adapting execution of the mainline logic at the fourth lower functional level if the CPU load continues to exceed the programming instructions' load on the CPU by a third predetermined threshold after the second domain specific response.

17. The apparatus as set forth in claim 16, wherein the self-regulating logic also incrementally adapting execution of the mainline logic back at increasingly higher functional levels in accordance to the set of adaptive policies; and the set of adaptive policies further include a fourth domain specific response of adapting execution of the mainline logic back at the third lower functional level if after the third domain specific response, the CPU load excess over the programming instructions' load on the CPU falls below the third predetermined threshold.

18. A computer implemented method, the method comprising the steps of:

a) monitoring CPU load of a CPU during execution of a plurality of programming instructions, by self-regulating logic of the programming instructions, and b) decrementally adapting execution of mainline logic of the programming instructions at decreasingly lower functional levels to reduce rate of CPU cycle consumptions, in accordance to a set of adaptive policies, by the self-regulating logic.

19. The method as set forth in claim 18, wherein step (a) further includes calibrating the programming instructions' load on the CPU.

20. The method as set forth in claim 18, wherein step (a) further includes computing the programming instructions' load on the CPU.

21. The method as set forth in claim 18, wherein the set of adaptive policies of step (b) specify a number of domain specific responses to a number of CPU load conditions.

22. The method as set forth in claim 18, wherein the different functional levels include a first functional level and a second functional level, which is lesser in functional than the first functional level; and step (b) includes adapting execution of the mainline logic from the first functional level to the second functional level if the CPU load exceeds the programming instructions' load on the CPU by a first predetermined threshold.

23. The method as set forth in claim 20, wherein step (b) further includes incrementally adapting execution of the mainline logic back at increasingly higher functional levels in accordance to the set of adaptive policies, in particular, adapting execution of the mainline logic back from the second functional level back to the first functional level if after adapting execution of the mainline logic to the second functional level, the CPU load excess over the programming instructions' load on the CPU falls below the first predetermined threshold.

24. The method as set forth in claim 23, wherein said adaptation of execution of the mainline logic from the first functional level to the second functional level, or from the second function level back to the first functional level, is performed only if the mainline logic has been adapted to execute at the first or the second functional level respectively for at least a predetermined amount of time.

25. The method as set forth in claim 23, wherein step (a) further includes temporarily suspending monitoring of CPU load for a predetermined amount of time, whenever step (b) is performed to adapt the mainline logic to execute at a new functional level.

26. The method as set forth in claim 23, wherein said adaptation of execution of the mainline logic from the first functional level to the second functional level, or from the second function level back to the first functional level, is performed only if the CPU load excess over the programming instruction's load on the CPU is above or below the first predetermined threshold respectively by a predetermined amount of time.

27. The method as set forth in claim 22, wherein the different functional levels further include a third functional level, which is less in function than the second functional level; and step (b) further includes adapting execution of the mainline logic from the second functional level to the third functional level if the CPU load continues to exceed the programming instructions' load on the CPU by a second predetermined threshold after adapting execution of the mainline logic to the second functional level.

28. The method as set forth in claim 18, wherein the programming instructions implement a video conferencing application, and the different functional levels include a first full functional level.

29. The method as set forth in claim 28, wherein the different functional levels further include a second functional level with local video display frozen; and step (b) includes adapting execution of the programming instructions at the second functional level if the CPU load exceeds the programming instructions' load on the CPU by a first predetermined threshold.

30. The method as set forth in claim 29, wherein step (b) further includes incrementally adapting execution of the mainline logic back at increasingly higher functional levels in accordance to the set of adaptive policies, in particular, adapting execution of the mainline logic back at the first full functional level if after adapting execution of the mainline logic at the second lower functional level with local video display frozen, the CPU load excess over the programming instructions' load on the CPU falls below the first predetermined threshold.

31. The method as set forth in claim 29, wherein the different functional levels further include a third functional level with remote video display frame rate being slowed down; and step (b) includes adapting execution of the programming instructions at the third functional level if the CPU load continues to exceed the programming instructions' load on the CPU by a second predetermined threshold after adapting execution of the programming instructions at the second functional level.

32. The method as set forth in claim 31, wherein step (b) further includes incrementally adapting execution of the mainline logic back at increasingly higher functional levels in accordance to the set of adaptive policies, in particular, adapting execution of the mainline logic back at the second lower functional level with local video display frozen if after adapting execution of the mainline logic at the third lower functional level with remote video frame rate slowed down, the CPU load excess over the programming instructions' load on the CPU falls below the second predetermined threshold.

33. The method as set forth in claim 31, wherein the different functional levels further include a fourth functional level with remote video display frame rate being systematically dropped; and step (b) includes adapting execution of the programming instructions at the fourth functional level if the CPU load continues to exceed the programming instructions' load on the CPU by a third predetermined threshold after adapting execution of the programming instructions at the third functional level.

34. The method as set forth in claim 33, wherein step (b) further includes incrementally adapting execution of the mainline logic back at increasingly higher functional levels in accordance to the set of adaptive policies, in particular, adapting execution of the mainline logic back at the third lower functional level with remote video frame rate slowed down if after adapting execution of the mainline logic at the fourth lower functional level with remote video frames being systematically dropped, the CPU load excess over the programming instructions' load on the CPU falls below the third predetermined threshold.

* * * * *